Nov. 15, 1966  J. W. GRAY ET AL  3,286,028
TRACING DEVICE
Filed Jan. 25, 1963  2 Sheets-Sheet 1
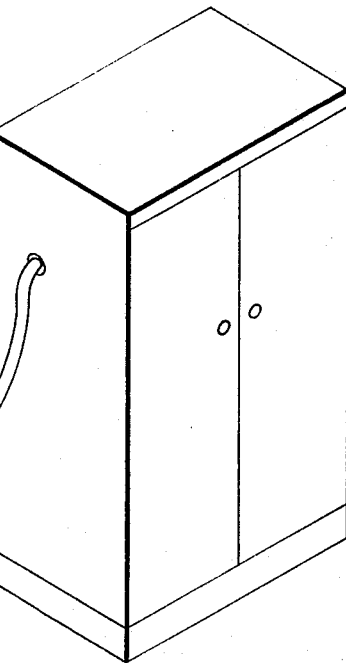
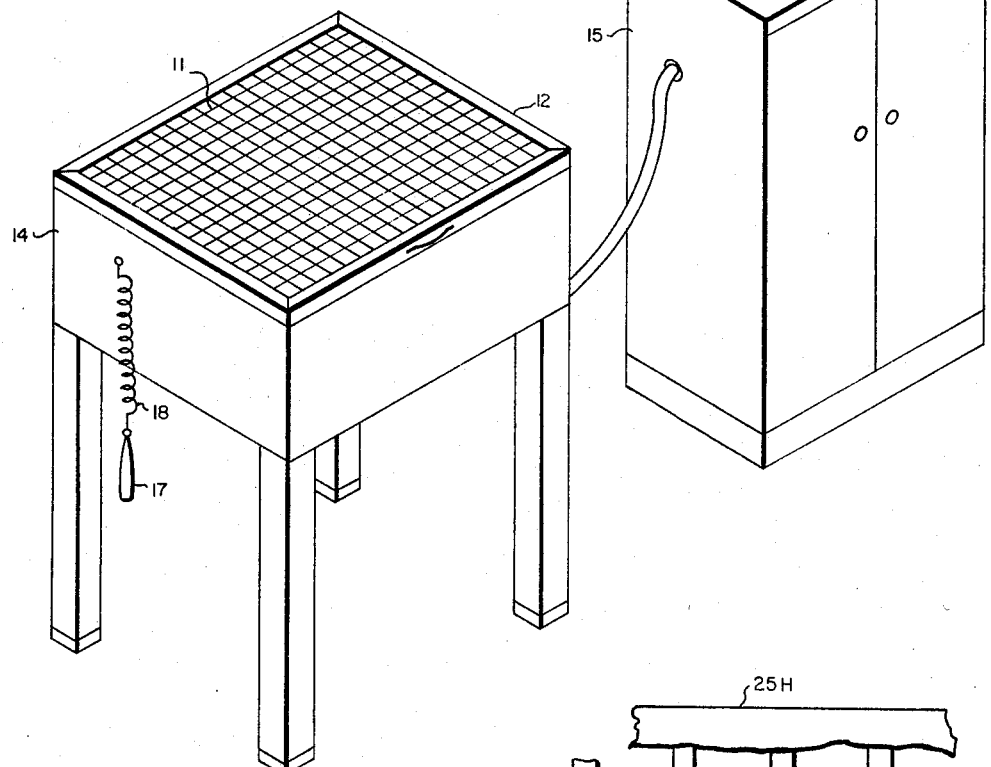
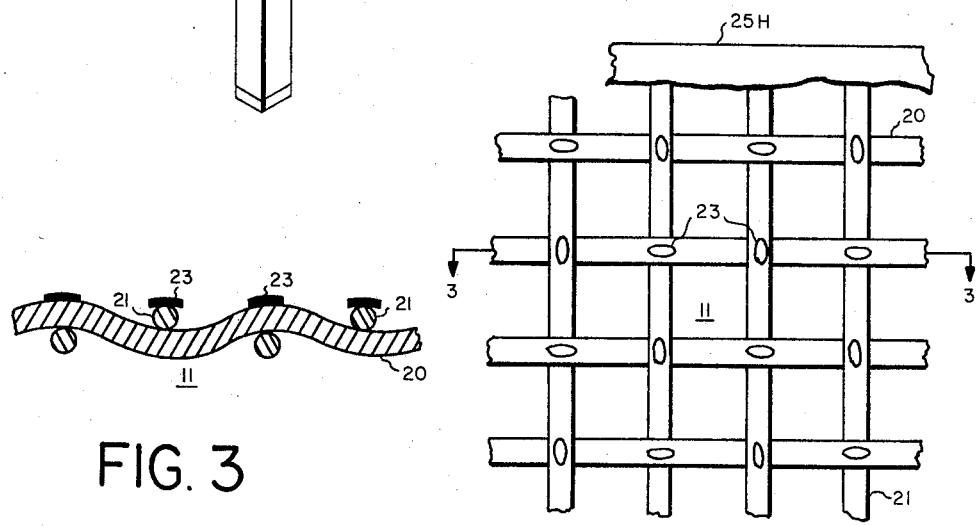
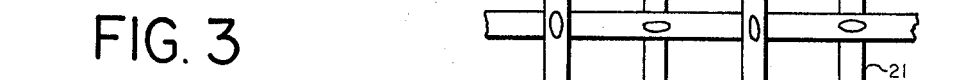
FIG. 1
FIG. 3
FIG. 2

United States Patent Office 3,286,028
Patented Nov. 15, 1966

3,286,028
TRACING DEVICE
John W. Gray, Pleasantville, and Arvid W. Jacobson, Millwood, N.Y., assignors to General Precision, Inc., a corporation of Delaware
Filed Jan. 25, 1963, Ser. No. 253,953
7 Claims. (Cl. 178—18)

This invention relates to tracing devices and more particularly to tracing devices, utilizing a stylus, which provide electric signals for continuously indicating the instantaneous coordinate location of the stylus; and in addition to the above a novel method for constructing the position-to-voltage transducer utilized in the disclosed tracing device.

It is often desirable or necessary to transmit information relative to documents, maps, etc. from one location to another remote location. The transmission may take many forms; however, one common form widely used is to trace the document and have a repeater at the remote location reproduce the document in synchronism with the tracing.

The information is transmitted either mechanically or electrically and generally consists of transmitting the instantaneous coordinate position of the tracing stylus continuously so that a writing stylus at the remote location can be properly positioned to provide a faithful reproduction of the original.

In many instances it is necessary to store the coordinate positions of this image for later use in a computer or for transmission at a later time. Thus, the coordinate information must be in the electrical form if this is to be accomplished conveniently with existing storage and computing equipment.

One object of the invention is to provide a tracing device utilizing a hand-propelled tracing stylus as its only moving part for providing electric signals which continuously indicate the instantaneous coordinates of the stylus when it contacts the device.

Another object of the invention is to provide a tracing device as set forth above which is easily and inexpensively manufactured.

A further object of the invention is to provide a tracing device as set forth which has no moving parts other than an unmounted hand-propelled stylus.

Yet another object is to provide a novel method of constructing the transducer for a tracing device as set forth above which results in a material reduction in the cost of manufacture and simultaneously provides a more reliable and improved product.

The foregoing and other objects and advantages of the invention will become more apparent from a consideration of the drawings and specification where two embodiments of the invention are shown and described in detail for illustration purposes only.

In the drawings:

FIGURE 1 is an isometric view of a complete stylus position defining system utilizing a novel tracing device constructed in accordance with the invention.

FIGURE 2 is a partial plan view of the novel wire mesh transducer shown in FIGURE 1;

FIGURE 3 is a cross-sectional view taken on the line 3—3 of FIGURE 2;

Figure 4:
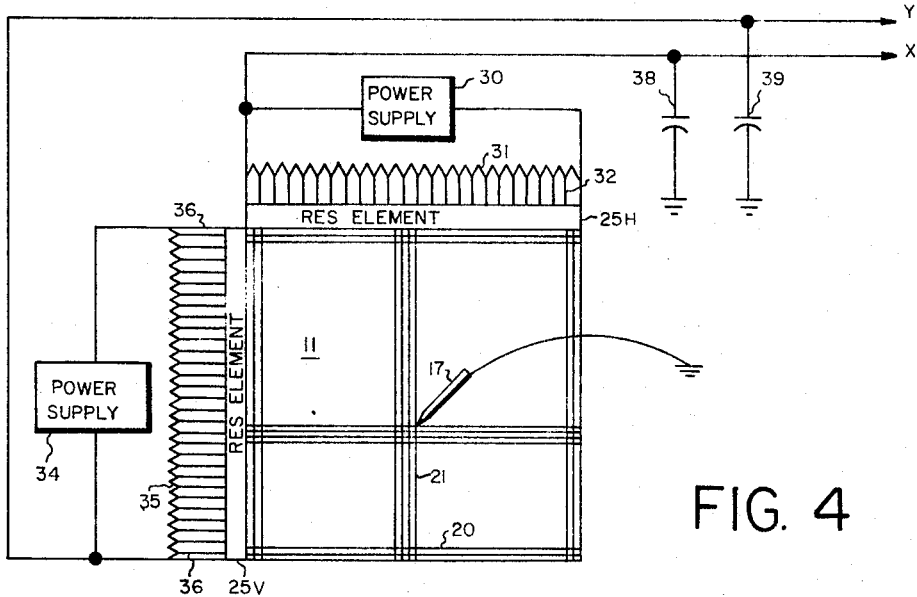
FIGURE 4 is a schematic drawing showing one embodiment of the tracing device.

In FIGURE 1 a wire mesh grid 11 it attached to a frame 12 hinged on a supporting table 14. The frame 12 and grid 11 are so arranged that when the frame is lifted the grid is raised which permits the removal or insertion of the item to be traced.

An equipment cabinet 15 stores the necessary power supplies and the recording or other auxiliary equipment for use with the system. The power supplies and the auxiliary equipment are connected to the grid 11 by a cable which extends therebetween. The tracing stylus 17 is shown suspended by a coiled wire 18 which in one embodiment is electrically connected as will be described in detail later.

FIGURES 2 and 3 illustrate the constructional details of grid 11. The grid is made of an enamelled copper wire mesh having a plurality of interlaced woven horizontal and vertical wires 20 and 21, respectively. The wires typically have a diameter of about .005″ and are center spaced about .020″ from each other. For this purpose AWG38 enamelled copper wire woven 50 wires to the inch in each direction may be used. The material and the spacing may be varied; however, with the above example about 60% of the area will be clear thus providing an excellent view of the material to be traced under the mesh. In addition use of the above mesh provides an improvement in the contrast ratio of the material since it eliminates a great deal of the diffuse light which would otherwise reflect from the surface of the material.

The enamel insulation on the wires 20 and 21 is removed in the vicinity of each intersection on the upper wire only and an abrasion resistant metal 23 is applied to the exposed wire. The insulation may be removed chemically or by grinding and rhodium or chromium may be plated or vacuum deposited on the exposed portion of the horizontal and vertical wires 20 and 21 respectively.

One end of each of the vertical wires 21 has its insulation removed and is attached to a linear resistive element 25H. The horizontal wires also have one end stripped and attached to another resistive element 25V, shown in FIGURES 4 and 5. The resistive element may be a liquid or paste resistive material painted on the wires or may be a nichrome wire to which the wires in the mesh 11 are spot welded. In those instances where a high resistance is desired the wires 20 and 21 may be cemented to resistive graphite elements. In each of the assembly methods the spacing of the vertical and horizontal wires should be maintained as close as possible to the spacing in the mesh. Small variation may be tolerated, however, the spacing should not be permitted to deviate by a large amount since the determination of the exact location of the stylus depends to a great extent on the maintenance of uniform spacing throughout the mesh and the attachment to the resistive elements. Sufficient uniformity may be achieved by combing the stripped ends and clamping them against movement prior to applying or attaching the resistive elements 25H and 25V.

Figure 5:
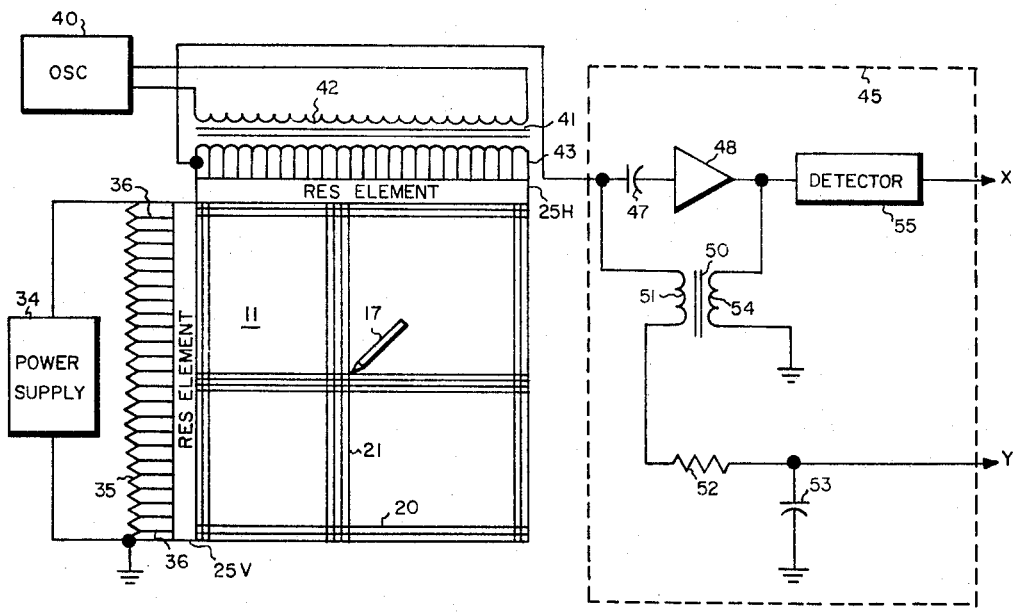
FIGURE 5 is a schematic drawing showing a second embodiment of the tracing device.

FIGURES 4 and 5 are schematic illustrations of two embodiments of tracing systems each of which provides two unidirectional voltages the magnitudes of which correspond respectively to the $x$ and $y$ coordinate location of the stylus 17.

In the embodiment of FIGURE 4 the stylus 17 is directly connected to ground. Element 25H is connected across a low voltage direct current power supply 30 and in parallel with a tapped resistor 31. The taps 32 from resistor 31 are connected to element 25H in the same manner as conductors 21. This arrangement provides a more uniform voltage drop across element 25H thus assuring a more accurate determination of the stylus position.

Elements 25V, FIGURE 4, is connected across a low voltage direct current power supply 34 and in parallel with a tapped resistor 35. The taps 36 from resistor 35 are connected to element 25V in the same manner as conductors 20 of grid 11.

One side of element 25H is connected to ground by a capacitor 38 and one side of element 25V is connected to ground by a capacitor 39. The voltages across capacitors 38 and 39 are directly proportional to the $x$ and $y$ coordinates, respectively, of the stylus position.

With the arrangement shown in FIGURE 4 linear voltage gradients are provided along elements 25V and 25H. Thus, when the stylus moves from the lower left-hand corner of the mesh to the right, the voltage across capacitor 38 increases from the ground or reference potential linearly and corresponds at all times to the actual linear displacemenet of the stylus from the extreme left-hand position. Likewise, as the stylus is moved upwards the voltage across capacitor 39 increases from the ground or reference potential linearly and corresponds at all times to the actual linear displacement of the stylus from the extreme lower position. Capacitors 38 and 39 are provided for smoothing and prevent the voltage at the outputs labeled $x$ and $y$ from falling to zero with momentary contact break as the stylus moves across the mesh.

The embodiment illustrated in FIGURE 5, while more complicated than that shown in FIGURE 4, offers a worthwhile advantage since no connection to the stylus is required. In this embodiment power supply 30 and resistor 31 are replaced by an oscillator 40 and a transformer 41, respectively. The primary winding 42 of the transformer is connected directly to oscillator 40 and the tapped secondary winding 43 is connected to element 25H in the same manner as tapped resistor 31 of FIGURE 4.

The lower end of resistor 35 is connected to ground or a reference potential and the left end of secondary winding 43 of transformer 41 is connected to a conversion circuit 45 which separates the combined $x$ and $y$ coordinates applied to it. The function of stylus 17 in this embodiment, is to short-circuit at least one ($x$) wire 21 and one ($y$) wire 20 together by simultaneously contacting one exposed area on a wire 21 and one on a wire 20. When this is done the $x$ fraction of the total alternating voltage applied by secondary 43 to element 25H is added in series with the $y$ fraction of the direct voltage applied by resistor 35 to element 25V, the sum appearing at the left end of secondary winding 43 of transformer 41.

Conversion circuit 45 has a condenser 47 connected between one side of winding 43 and the input of a unity gain high impedance input amplifier 48. A one-to-one transformer 50 has its primary winding 54 connected between the output of amplifier 48 and ground or the reference voltage. The secondary winding 51 is connected between the left end of winding 43 and one end of a resistor 52 which has its other end connected to ground or the reference voltage by a capacitor 53. The arrangement provides for the separation of the direct and alternating components available at winding 43.

The direct component passes through the secondary winding 51 and resistor 52 to the output labeled $y$ and the alternating component passes through condenser 47 and amplifier 48. It is passed through a detector 55 connected to the output of amplifier 48 and converted to a direct potential and is available at the output labeled $x$.

The direct component is removed before the input to amplifier 48 by capacitor 47 while the alternating component is bucked out by transformer 50. Resistor 52 and capacitor 53 provide a filter network with a small time constant for removing any small residual alternating component before the $y$ output. This particular arrangement is necessary since an R-C filter sufficient to remove the entire alternating component would have too large a time constant and would severely limit the maximum stylus velocity.

In the embodiment of FIGURE 5 the impedance between the shorted end of winding 43 and ground varies as a function of the $y$ coordinate. This fact does not, however, affect the alternating voltage applied to the input of conversion circuit 45 since the alternating impedance of the circuit is very high. Thus, the A.-C. voltage drop across the variable resistance is negligible.

While several embodiments of the invention have been described and shown in detail for illustration purposes, applicants wish it clearly understood that the invention is not limited to the specific details disclosed.

What is claimed is:

1. A tracing device including a hand-propelled stylus for providing two varying voltages the instantaneous values of which correspond to the instantaneous coordinate location of the tracing stylus comprising, an interlaced wire mesh having a plurality of horizontal and vertical conductors insulated from each other, each of said conductors having a plurality of spaced exposed uninsulated areas on one surface of the mesh, first resistive means electrically interconnecting the horizontal conductors, second resistive means electrically interconnecting the vertical conductors, first means for applying a voltage to the first resistive means, second means for applying a voltage to the second resistive means, and means associated with said stylus for simultaneously contacting one exposed area of at least one horizontal and one vertical conductor to establish circuit connections for providing two voltages which correspond to the coordinate location of the stylus and its associated means.

2. A tracing device including a hand-propelled stylus for providing two varying unidirectional voltages the instantaneous values of which correspond to the instantaneous coordinate location of the tracing stylus comprising, an interlaced wire mesh having a plurality of horizontal and vertical insulated conductors, each of said conductors having a plurality of spaced exposed uninsulated areas on one surface of the mesh, first resistive means electrically interconnecting the horizontal conductors, second resistive means electrically interconnecting the vertical conductors, first means for applying a direct current voltage to the first resistive means, second means for applying a direct current voltage to the second resistive means, and means for connecting the said stylus to a reference potential whereby said stylus when it contacts at least one uninsulated area of at least one horizontal and one vertical conductor provides a direct current potential with respect to said reference potential at one end of each resistive means, said potentials appearing at the horizontal and vertical resistive means corresponding to the $x$ and $y$ coordinates respectively of the stylus location.

3. The tracing device set forth in claim 2 further characterized by having an electric storage means connected to each said resistive means to prevent the voltage corresponding to the coordinates of the stylus position from falling to zero when the stylus is moved along the mesh due to momentary contact breaks with the uninsulated areas of the horizontal and vertical conductors.

4. The tracing device set forth in claim 3 in which the conductors forming the mesh are copper and the uninsulated areas are coated with an abrasion resistant electrically conductive material.

5. A tracing device including an unconnected freely movable hand-propelled stylus for providing two varying unidirectional voltages the instantaneous magnitudes of which correspond to the instantaneous coordinate location of the tracing stylus comprising, an interlaced wire mesh having a plurality of horizontal and vertical insulated conductors, each of said conductors having a plurality of spaced exposed uninsulated areas on one surface of the mesh, first resistive means electrically interconnecting the parallel conductors in one direction, second resistive means electrically interconnecting the parallel conductors extending in the opposite direction, first means for applying an alternating voltage to the first resistive means, second means for applying a unidirectional voltage to the second resistive means, means for connecting one end only of the second resistive means to a reference potential, and means connected to one end only of the first resistive means for separating the direct current component corresponding to one coordinate and for separating and converting the alternating component corresponding to the other coordinate to a direct current potential whenever the stylus is placed in contact with at least one uninsulated area of at least one horizontal and one vertical conductor.

6. The tracing device set forth in claim 5 in which the means connected to one end only of the first resistive means comprises, a unity gain inverting amplifier, a capacitor connected between the amplifier input and the first resistive means, a detector connected to the amplifier for providing a direct current output having voltage corresponding to the magnitude of the alternating voltage from the amplifier, and a transformer having one winding connected to the first resistive means and the other to the amplifier output for bucking out the alternating component whereby only the direct current voltage component corresponding to the voltage from the second resistive means is passed.

7. The tracing device set forth in claim 6 in which the conductors forming the mesh are copper and the uninsulated areas are coated with an abrasion resistant electrically conductive material.

References Cited by the Examiner

UNITED STATES PATENTS

| | | | |
|---|---|---|---|
| 2,168,049 | 8/1939 | Skellett | 178—20 |
| 2,704,305 | 3/1955 | McLaughlin et al. | 178—18 |
| 2,907,824 | 10/1959 | Peek | 178—18 |
| 2,977,672 | 4/1961 | Telfer | 29—155.5 |
| 3,064,332 | 11/1962 | Kaplan | 29—155.5 |
| 3,128,458 | 4/1964 | Romero | 178—18 |

OTHER REFERENCES

German printed application No. 1,080,592, Grundig, April 28, 1960.

NEIL C. READ, *Primary Examiner.*

ROBERT H. ROSE, *Examiner.*

A. J. DUNN, T. A. ROBINSON, *Assistant Examiners.*